US012578830B2

(12) United States Patent
Tong et al.

(10) Patent No.: US 12,578,830 B2
(45) Date of Patent: Mar. 17, 2026

(54) TOUCH STRUCTURE, TOUCH DISPLAY PANEL, AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Kemeng Tong, Beijing (CN); Cong Fan, Beijing (CN); Fan He, Beijing (CN); Yu Wang, Beijing (CN); Xiangdan Dong, Beijing (CN); Jiangtao Deng, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/081,620

(22) Filed: Mar. 17, 2025

(65) Prior Publication Data

US 2025/0208740 A1 Jun. 26, 2025

Related U.S. Application Data

(63) Continuation of application No. 18/534,525, filed on Dec. 8, 2023, now Pat. No. 12,293,053, which is a continuation of application No. 17/616,520, filed as application No. PCT/CN2021/078106 on Feb. 26, 2021, now Pat. No. 11,907,488.

(51) Int. Cl.
*G06F 3/044* (2006.01)

(52) U.S. Cl.
CPC .......... *G06F 3/0446* (2019.05); *G06F 3/0445* (2019.05); *G06F 2203/04112* (2013.01)

(58) Field of Classification Search
CPC .... G06F 3/0446; G06F 3/0445; G06F 3/0448; G06F 2203/04112
See application file for complete search history.

(56) References Cited

U.S. PATENT DOCUMENTS 11,424,298 B2 * 8/2022 Li .......................... H10K 59/40

* cited by examiner

*Primary Examiner* — Deeprose Subedi
(74) *Attorney, Agent, or Firm* — Scully, Scott, Murphy & Presser, P.C.

(57) ABSTRACT

A touch structure, a touch display panel, and a display device are provided. The touch structure includes a substrate and a first metal grid electrode layer, an insulating layer, a second metal grid electrode layer on the substrate. The first metal grid electrode layer is on a side of the second metal grid electrode layer away from the substrate; the first metal grid electrode layer includes a plurality of first metal grids formed by a plurality of first metal lines, the second metal grid electrode layer includes a plurality of second metal grids formed by a plurality of second metal lines, first portions of the plurality of the first metal lines and second portions of the plurality of the second metal lines have same line extension directions, respectively, and overlap with each other in a direction perpendicular to a surface of the substrate.

20 Claims, 8 Drawing Sheets

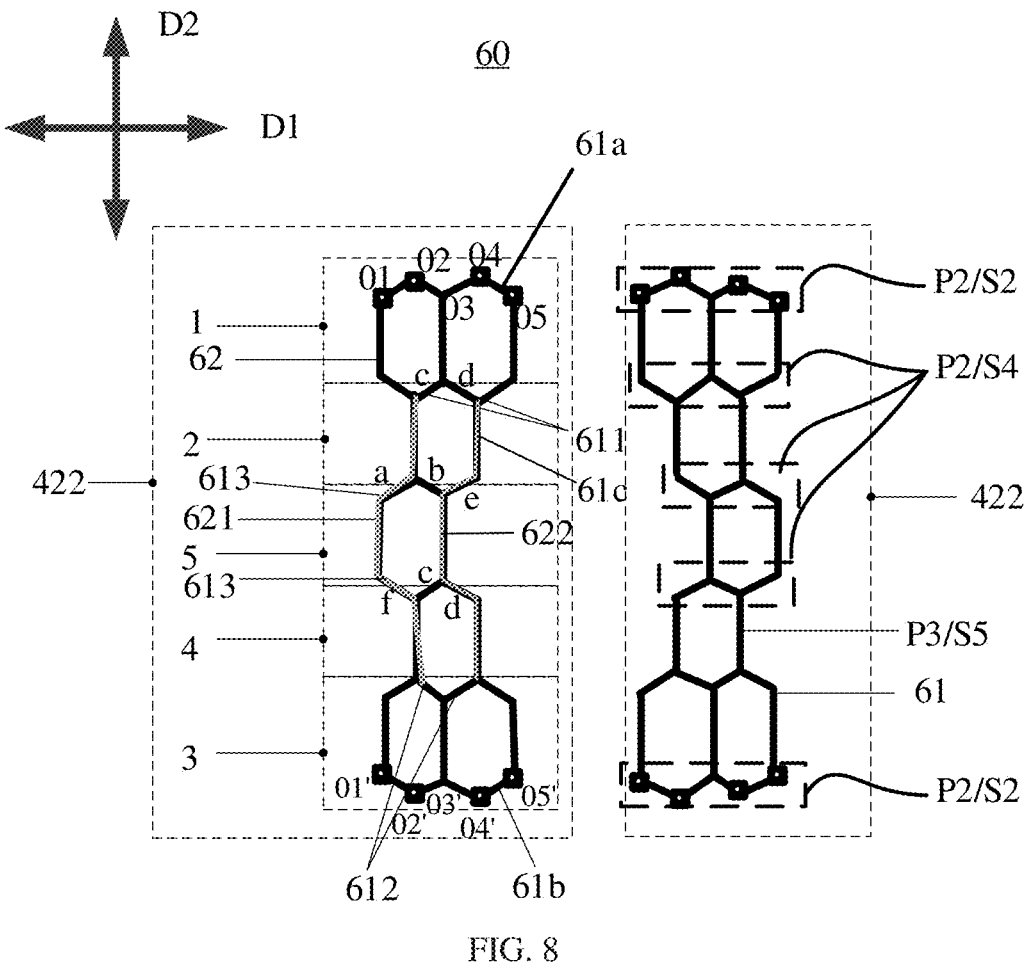
FIG. 8
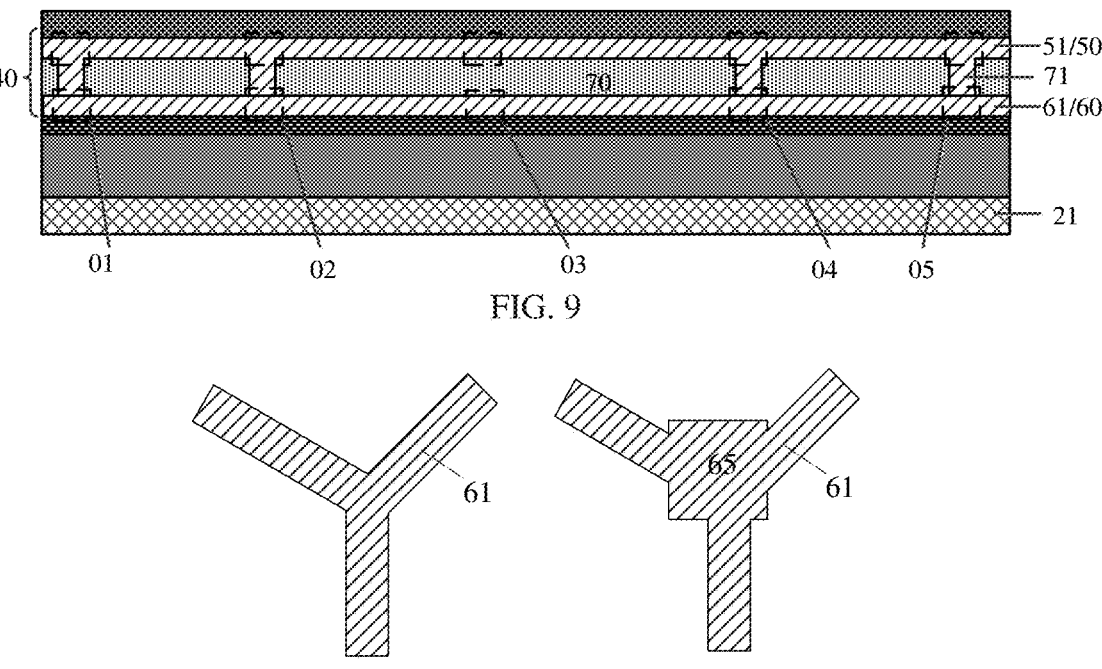
FIG. 9
FIG. 10

30

TOUCH STRUCTURE, TOUCH DISPLAY PANEL, AND DISPLAY DEVICE

CROSS REFERENCE TO RELATED APPLICATIONS

The present application is a continuation application of the U.S. application Ser. No. 18/534,525, which is a continuation application of the U.S. application Ser. No. 17/616, 520, as a U.S. National Phase Entry of International Application No. PCT/CN2021/078106 filed on Feb. 26, 2021, the entire disclosure of which is incorporated herein by reference as part of the disclosure of this application for any purpose.

TECHNICAL FIELD

Embodiments of the present disclosure relate to a touch structure, a touch display panel, and a display device.

BACKGROUND

The user interface with touch function is widely used in various types of electronic devices, such as display devices including mobile phones, tablet computers, or the like. The touch structure for achieving the touch function comprises a touch electrode structure, the configuration of which has an effect on the sensitivity and accuracy of the touch function, and thus it is an important factor affecting the user experience.

SUMMARY OF THE DISCLOSURE

At least an embodiment of the present disclosure provides a touch structure comprising a substrate and a first metal grid electrode layer, an insulating layer, and a second metal grid electrode layer on the substrate. The first metal grid electrode layer is located on a side of the second metal grid electrode layer away from the substrate, the insulating layer is disposed between the first metal grid electrode layer and the second metal grid electrode layer; the first metal grid electrode layer comprises a plurality of first metal grids formed by a plurality of first metal lines, the second metal grid electrode layer comprises a plurality of second metal grid formed by a plurality of second metal lines, first portions of the plurality of the first metal lines and second portions of the plurality of the second metal lines have same line extension directions, respectively, and overlap with each other in a direction perpendicular to a surface of the substrate, the insulating layer includes edge slope parts covering the second portions of the plurality of the second metal lines in a direction perpendicular to the line extension direction, each edge slope part forms a step relative to the surface of the substrate, and the first portions of the plurality of the first metal lines at least partly do not overlap with the edge slope parts.

For example, in the touch structure provided by at least one embodiment of the present disclosure, in a plane parallel to the surface of the substrate, a line width of each second portion of the plurality of the second metal lines is greater than a line width of each first portion of the plurality of the first metal lines.

For example, in the touch structure provided by at least one embodiment of the present disclosure, orthographic projections of the first portions of the plurality of the first metal lines on the substrate are within orthographic projections the second portions of the plurality of the second metal lines on the substrate.

For example, in the touch structure provided by at least one embodiment of the present disclosure, the first portions of the plurality of the first metal lines comprise a plurality of first metal sub-lines, the second portions of the plurality of the second metal lines comprise a plurality of second metal sub-lines, the plurality of the first metal sub-lines and the plurality of the second metal sub-lines overlap with each other in a direction perpendicular to the surface of the substrate.

For example, in the touch structure provided by at least one embodiment of the present disclosure, the first metal grid electrode layer comprises a plurality of first touch sub-electrodes and a plurality of first connection electrodes disposed along a first direction, the plurality of the first touch sub-electrodes and the plurality of the first connection electrodes are alternately distributed and electrically connected in sequence to form the first touch electrode extending along the first direction; the first metal grid electrode layer further comprises a plurality of second touch sub-electrodes which are disposed in sequence and spaced apart from each other along a second direction, the first direction crosses with the second direction; each of the plurality of the first touch sub-electrodes and each of the second touch sub-electrodes are spaced apart from each other, and each of the plurality of the first touch sub-electrodes and the second touch sub-electrodes comprises the plurality of the first metal grids; the second metal grid electrode layer comprises a plurality of second connection electrodes which are spaced apart from each other, each of the plurality of the second connection electrodes is electrically connected with an adjacent second touch sub-electrode through a plurality of via-holes in the insulating layer, so that the adjacent second touch sub-electrodes are electrically connected to form the second touch electrode extending in the second direction.

For example, in the touch structure provided by at least one embodiment of the present disclosure, first portions of the plurality of the first metal sub-lines comprises first sub-portions located at side ends of the first touch sub-electrodes near the second connection electrodes, second portions of the plurality of the second metal sub-lines comprises second sub-portions located at side ends of second connection electrodes near the first touch sub-electrodes, and in a direction perpendicular to the surface of the substrate, the first sub-portions overlap with the second sub-portions, and the first sub-portions are electrically connected with the second sub-portions through a plurality of via-holes in the insulating layer.

For example, in the touch structure provided by at least one embodiment of the present disclosure, the first portions of the plurality of the first metal sub-lines further comprises third sub-portions located in the first connection electrodes, and the second portions of the plurality of the second metal sub-lines further comprises fourth sub-portions located in the second connection electrodes, in a direction perpendicular to the surface of the substrate, the third sub-portions overlap and are electrically insulated from the fourth sub-portions.

For example, in the touch structure provided by at least one embodiment of the present disclosure, a ratio of the line width of the second portions of the plurality of the second metal lines to the line width of the first portions of the plurality of the first metal lines is R1, where $2 \geq R1 > 1$.

For example, in the touch structure provided by at least one embodiment of the present disclosure, each of the plurality of the first metal lines has a line width of 3 μm-5 μm, and the line width of the second portions of the plurality of the second metal lines is 0.2 μm-0.5 μm greater than the line width of the first metal lines.

For example, in the touch structure provided by at least one embodiment of the present disclosure, the plurality of the second metal lines further include third portions which do not overlap with the plurality of the first metal lines, a ratio of the line width of the third portions of the plurality of the second metal lines to the line width of the first portions of the plurality of the first metal lines is R2, where $1 > R2 \geq 0.6$.

For example, in the touch structure provided by at least one embodiment of the present disclosure, the line width of the third portions of the plurality of the second metal lines is 0.2 μm-0.5 μm less than the line width of the first metal lines.

For example, in the touch structure provided by at least one embodiment of the present disclosure, the third portions of the plurality of the second metal lines comprises connection portions between the second sub-portions and the fourth sub-portions.

For example, in the touch structure provided by at least one embodiment of the present disclosure, each of the plurality of the first metal lines has a line width of 3 μm, each of the second portions of the second metal lines has a line width of 3.2 μm, and each of the third portions of the second metal lines has a line width of 2.8 μm.

For example, in the touch structure provided by at least one embodiment of the present disclosure, each of the plurality of the second metal lines has a line width of 2.5 μm-4.5 μm, and the line width of the first portions of the plurality of the first metal lines is 0.2 μm-0.5 μm less than the line width of the second metal lines.

For example, in the touch structure provided by at least one embodiment of the present disclosure, the plurality of the first metal lines further include fourth portions that do not cross with the plurality of the second metal lines, and a line width of the fourth portions of the plurality of the first metal lines is greater or less than the line width of the second metal line.

For example, in the touch structure provided by at least one embodiment of the present disclosure, the second portions of the plurality of the second metal lines as a whole are in a shape of a plurality of fold lines arranged in spacing.

For example, in the touch structure provided by at least one embodiment of the present disclosure, each of the plurality of the second connection electrodes along the second direction comprise: a first metal grid row comprising the plurality of the second metal grids arranged along the first direction; and a second metal grid row which is adjacent to and connected with the first metal grid row and comprises at least one second metal grid arranged along the first direction. The amount of the second metal grids in the second metal grid row is less than or equal to the amount of the second metal grids in the first metal grid row, and the second metal lines of the second metal grids in the second metal grid row near the first metal grid row are second metal lines shared with the second metal grids in the first metal grid row.

For example, in the touch structure provided by at least one embodiment of the present disclosure, the second metal lines that the second metal grid row and the first metal grid row share are in a shape of a first fold line, and the plurality of fold lines arranged in spacing comprise the first fold line.

For example, in the touch structure provided by at least one embodiment of the present disclosure, the first metal grid row further comprises first unshared second metal lines opposite to the shared second metal line, and the first unshared second metal lines are in a shape of a second fold line, and the plurality of fold lines arranged in spacing comprise the second fold line.

For example, in the touch structure provided by at least one embodiment of the present disclosure, the plurality of via-holes comprise first via-holes located at turning positions of the second fold lines in the first unshared second metal lines, and the first metal grid row is electrically connected with one of the two second touch sub-electrodes adjacent to the second connection electrode where the first metal grid row is located through the first via-hole.

For example, in the touch structure provided by at least one embodiment of the present disclosure, each of the plurality of the second connection electrodes further comprise, along the second direction, a third metal grid row which is located on a side of the second metal grid row away from the first metal grid row, and comprises the plurality of the second metal grids arranged along the first direction; and a fourth metal grid row which is located on a side of the third metal grid row near the second metal grid row and adjacent to and connected with the third metal grid row, and comprises at least one of the second metal grids arranged along the first direction. The amount of the second metal grids in the fourth metal grid row is less than the amount of the second meal grids in the third metal grid row, and the second metal lines of the second metal grids in the fourth metal grid row near the third metal grid row are the second metal lines shared with the second metal grids in the third metal grid row.

For example, in the touch structure provided by at least one embodiment of the present disclosure, the third metal grid row further comprises second unshared second metal lines opposite to the second metal lines that the fourth metal grid row and the third metal grid row share, the second unshared second metal line are in a shape of a third fold line, and the plurality of fold lines arranged in spacing comprise the third fold line.

For example, in the touch structure provided by at least one embodiment of the present disclosure, the plurality of via-holes further comprise second via-holes located at turning positions of the third fold lines in the second unshared second metal lines, and the third metal grid row is electrically connected with another one of the two second touch sub-electrodes adjacent to the second connection electrode where the third metal grid row is located through the second via-hole.

For example, in the touch structure provided by at least one embodiment of the present disclosure, the second connection electrodes further comprise at least one intermediate metal grid row located between the second metal grid row and the fourth metal grid row, and each of the at least one intermediate metal grid row comprises at least one of the second metal grids.

For example, in the touch structure provided by at least one embodiment of the present disclosure, the at least one intermediate metal grid row comprises second metal lines shared with the second metal grid row or the fourth metal grid row, the second metal lines that the at least one intermediate metal grid row and the second metal grid row or the fourth metal grid row share are in a shape of a fourth fold line, and the plurality of fold lines arranged in spacing comprise the fourth fold line.

For example, in the touch structure provided by at least one embodiment of the present disclosure, the plurality of the first metal grids and the plurality of the second metal grids are in a hexagonal shape.

At least one embodiment of the present disclosure provides a touch display panel comprising a base substrate, and a display structure and any of the touch structures stacked on the base substrate.

At least one embodiment of the present disclosure provides a display device comprising the touch display panel.

BRIEF DESCRIPTION OF THE FIGURES

In order to clearly illustrate the technical solution of the embodiments of the disclosure, the drawings of the embodiments will be briefly described in the following; it is apparent that the described drawings are only related to some embodiments of the disclosure and are not limitative of the disclosure.

FIG. 8 shows a second metal grid electrode layer in FIG. 5;

FIG. 9 is a cross-sectional view along the cutting line B-B' in FIG. 5;

FIG. 10 is a schematic view of a vertex without a via-hole and a vertex with via-hole in the second metal grid;

DETAILED DESCRIPTION OF THE DISCLOSURE

Figure 1:
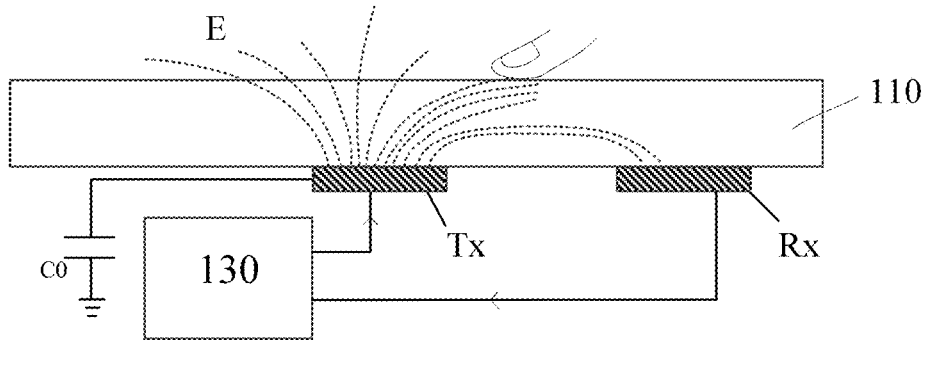
FIG. 1 is a schematic view of the working principle of a touch structure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but for distinguishing various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect/connection", "connecting/connected", etc., are not limited to define a physical connection or mechanical connection, but may also include an electrical connection, directly or indirectly. "On," "under," "right," "left" and the like are only used to indicate relative position relationship, and when the absolute position of the object which is described is changed, the relative position relationship may be changed accordingly.

The drawings in the present disclosure are not strictly drawn to actual scale. The numbers of the first touch electrodes, the second touch electrodes, the first touch sub-electrodes, the second touch sub-electrodes, the first metal grids, and the second metal grids in the touch structure are not restricted as those shown in the figures. The particular dimensions and numbers of various structures can be determined in accordance with practical requirements. The drawings of the present disclosure are merely schematically structural views.

Organic light-emitting dioxide (OLED) display panels have characteristics of self-illumination, high contrast, low energy consumption, wide viewing angle, fast response speed, usability in flexible panels, wide range of operating temperature, simplicity of manufacture, etc., and have a broad development prospect. To meet the diversified needs of users, it is great significance to integrate various functions in a display panel, such as the touch function, fingerprint recognition functional, and the like. For example, an implementation is to form an on-cell touch structure in an OLED display panel, which achieves a touch function in a display by forming the touch structure on a packaging film of the OLED display panel.

For example, a mutual capacitive touch structure comprises a plurality of touch electrodes including touch drive electrodes and touch sensing electrodes extending in different directions, the touch drive electrodes Tx and the touch sensing electrodes Rx form mutual capacitances for touch sensing at their intersections. The touch drive electrodes Tx are used to input a drive signal (a touch drive signal), and the touch sensing electrodes Rx are used to output a touch sensing signal. By inputting a drive signal to a touch drive electrode, e.g., extending in a longitudinal direction, and receiving a touch sensing signal from a touch sensing electrode, e.g., extending in a transverse direction, a detection signal that reflects the size of capacitance value at a coupling point (e.g., an intersection) of the transverse electrode and the longitudinal electrode can be obtained. When a finger touches a touch screen (e.g., cover glass), it has an effect on the coupling between the touch drive electrode and the touch sensing electrodes near the touch point to cause a change in the capacitance of mutual capacitance at the intersection of the two electrodes change, which results in a change in the touch sensing signal. In accordance with the variation data of two-dimensional capacitance of the touch screen based on the touch sensing signal, the coordinates of the touch point can be calculated.

FIG. 1 shows a schematic view of a mutual capacitive touch structure. As shown in FIG. 1, driven by the touch drive circuit 130, a touch drive signal is applied to the touch drive electrode Tx, thereby causing the generation of electric field lines E, which are received by the touch sensing electrode Rx to form a reference capacitance. When a finger touches the touch screen 110, a part of the electric field lines E generated by the touch drive electrode Tx are directed to the finger to form a finger capacitance due to the conductivity of human body so that the electric field lines E received by the touch sensing electrode Rx is reduced, and thus the capacitance value between the touch drive electrode Tx and the touch sensing electrode Rx is reduced. The touch drive circuit 130 obtains the size of capacitance value by the touch sensing electrodes Rx, which is compared with the reference capacitance to obtain a variation of capacitance value. Based on the data of the variation of capacitance value in combination with the position coordinates of respective touch capacitances, the coordinates of the touch points can be calculated.

Figure 2:
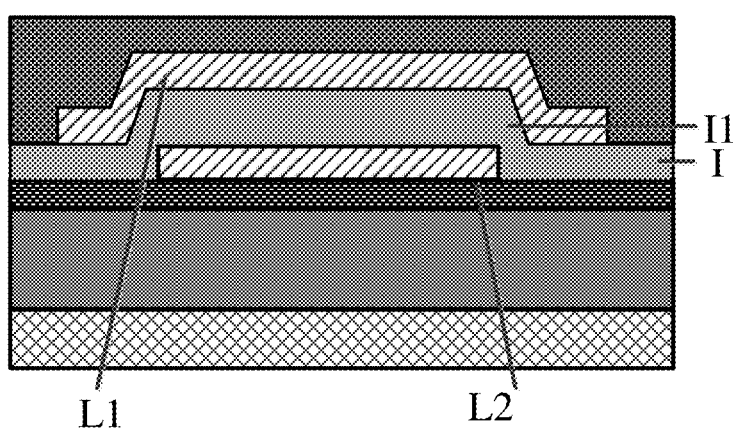
FIG. 2 is a schematic cross-sectional view of wirings in stack arrangement in a touch structure.
Figure 5:
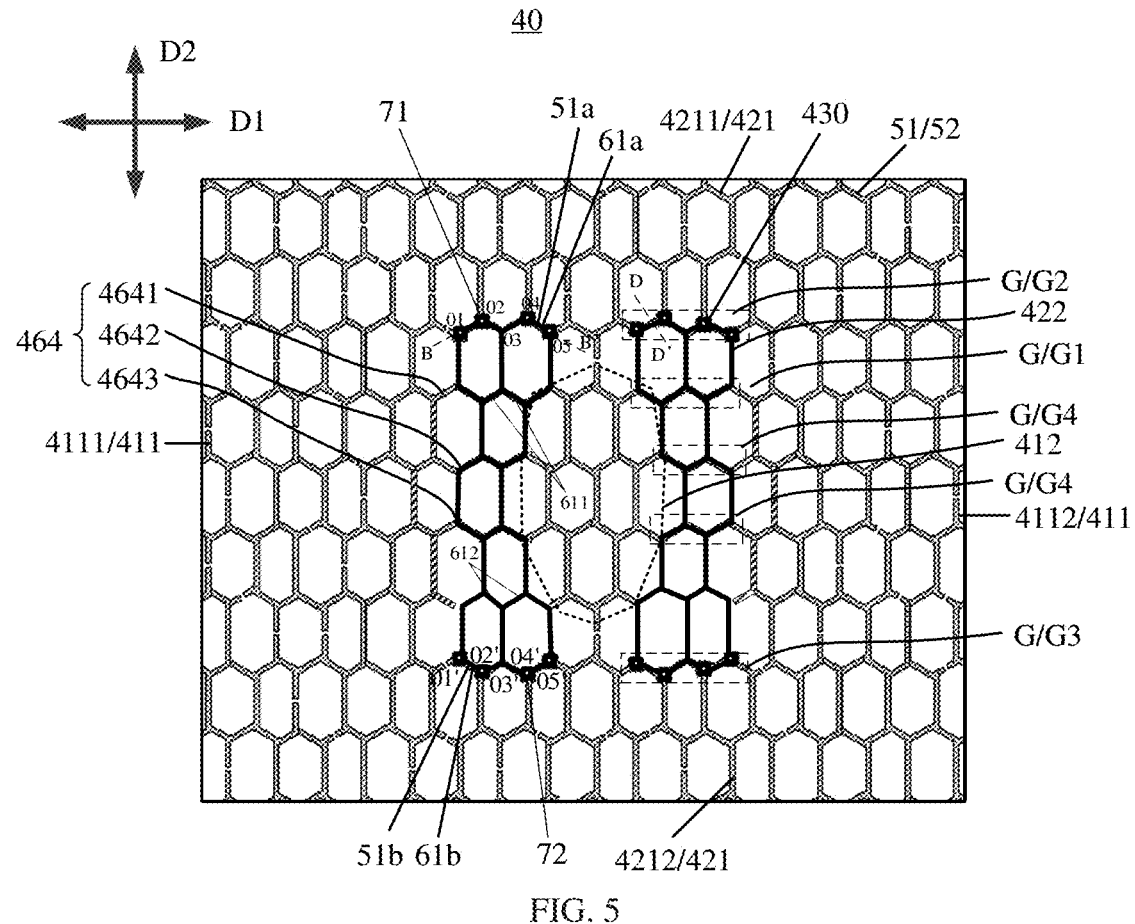
FIG. 5 is an enlarged schematic view of a region A in FIG. 4.

In some touch structures, a metal grid structure is used to form the touch sensing electrodes Rx and the touch drive electrodes Tx. For example, at the intersection positions of the touch sensing electrodes Rx and the touch drive electrodes Tx, one of the touch sensing electrodes Rx and the touch drive electrodes Tx electrically connects a plurality of sub-electrodes included in the touch sensing electrodes and the touch drive electrodes by bridging. At the bridging positions, the touch sensing electrodes Rx and the touch drive electrodes Tx have overlapping metal grids, the metal lines constituting these overlapping metal grids have the same line extension directions, respectively, and the particular forms thereof refer to the examples as shown in FIG. 5, which will be described below. For example, FIG. 2 shows a schematically cross-sectional view of the overlapping portions in a direction perpendicular to the line extension direction. As shown in FIG. 2, each touch sensing electrode Rx comprises a line L1 constituting a metal grid, and each touch drive electrode Tx has a line L2 constituting a metal grid, the line L1 and the line L2 are insulated by the insulating layer. At the edge position of the line L2, the insulating layer I has a climbing portion I1. During the preparation of the touch structure, the climbing portion I1 is prone to break, resulting in an electrical connection between the line L1 and the line L2 at the broken position of the climbing portion I1, so that the touch structure cannot achieve a touch function normally.

At least one embodiment of the present disclosure provides a touch structure comprising a substrate and a first metal grid electrode layer, an insulating layer, and a second metal grid electrode layer disposed on the substrate. The first metal grid electrode layer is located on a side of the second metal grid electrode layer away from the substrate, the insulating layer is disposed between the first metal grid electrode layer and the second metal grid electrode layer; the first metal grid electrode layer comprises a plurality of first metal grids formed by a plurality of first metal lines, the second metal grid electrode layer comprises a plurality of second metal grids formed by a plurality of second metal lines, first portions of the plurality of the first metal lines and second portions of the plurality of the second metal lines respectively have same line extension directions and overlap with each other in a direction perpendicular to the surface of the substrate, respectively, the insulating layer includes edge slope parts covering the second portions of the plurality of the second metal lines in a direction perpendicular to the line extension direction, each edge slope part forms a step relative to the surface of the substrate, and the first portions of the plurality of the first metal lines at least partially do not overlap with the edge slope parts.

The first portions of the plurality of the first metal lines at least partly do not overlap with the edge slope parts in the touch structure provided in the embodiment of the present disclosure, which can reduce the probability of short circuit caused by the electrical connection between the first portions of the plurality of the first metal lines with the second portions of the plurality of the second metal lines due to the breakage in the edge slope parts so as to improve the reliability of the touch structure.

Figure 3:
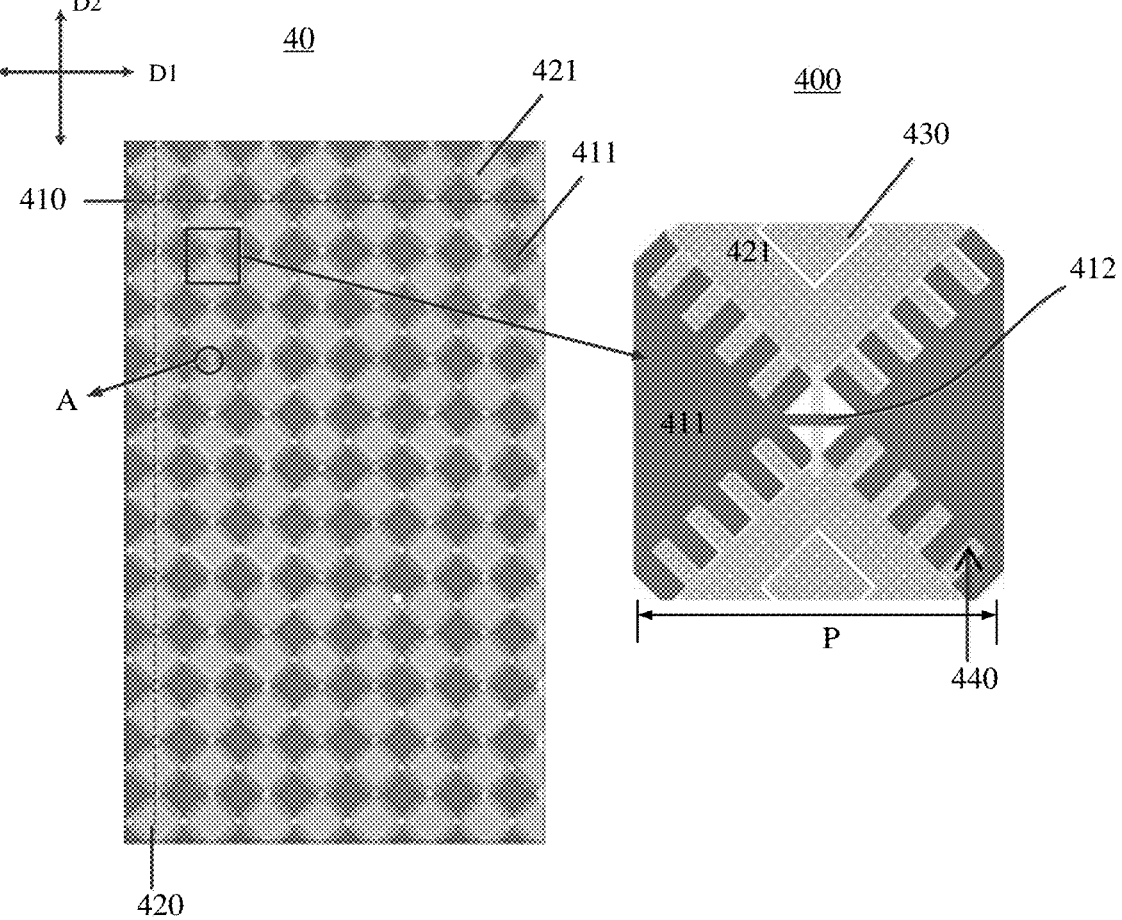
FIG. 3 is a schematic planar view of a touch structure provided in at least one embodiment of the present disclosure.

As an example, FIG. 3 is a schematic planar view of a touch structure 40 provided in at least one embodiment of the present disclosure. As shown in FIG. 3, the touch electrode structure 40 comprises a plurality of first touch electrodes 410 extending along a first direction D1 (a first touch electrode 410 corresponds to a position indicated by a respective dotted line in FIG. 3) and a plurality of second touch electrodes 420 extending along a second direction D2 (a second touch electrode 420 corresponds to a position indicated by a dotted line in FIG. 3). For example, the first touch electrode 410 is a touch sensing electrodes Rx, and the second touch electrode 420 is a touch drive electrode Tx. However, it is not limited in embodiments of the present disclosure. In other embodiments, the first touch electrodes 410 can be a touch drive electrode Tx, while the second touch electrode 420 can be a touch sensing electrode Rx.

Figure 4:
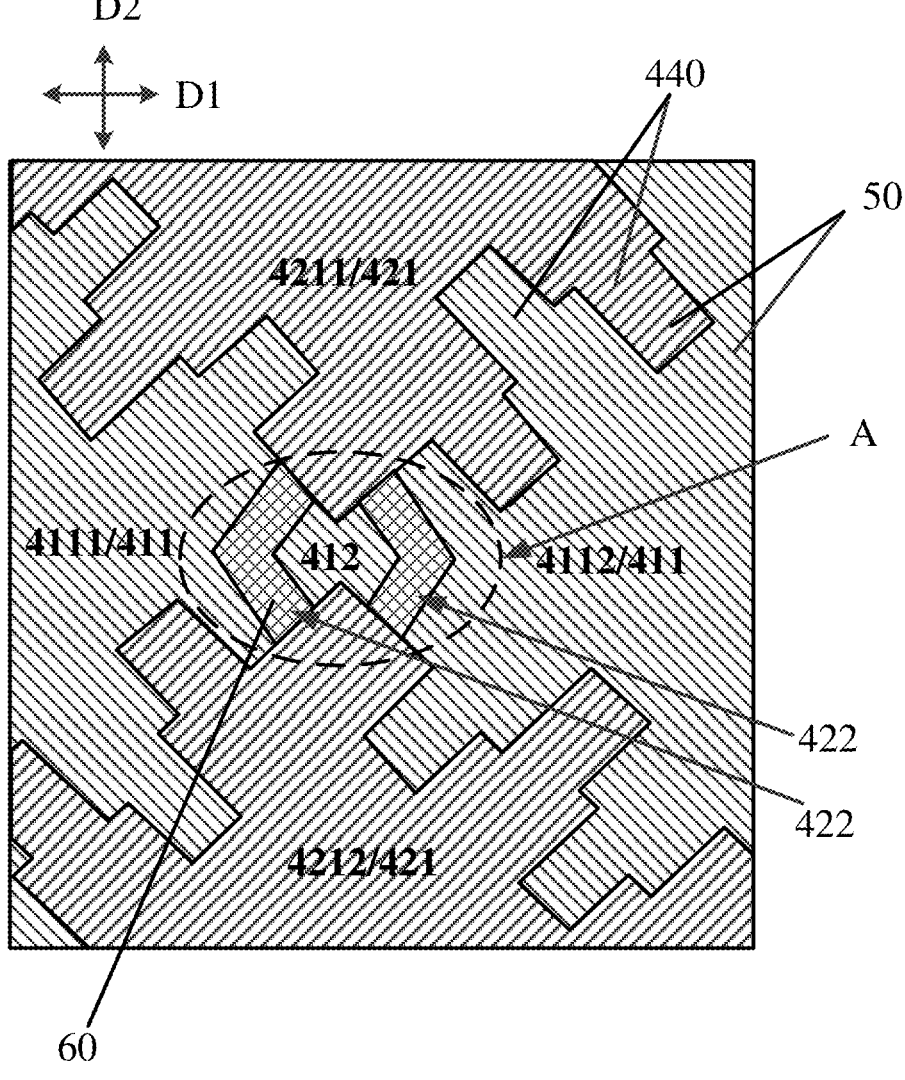
FIG. 4 is an enlarged schematic view of a part in the box in FIG. 3.

Each of the first touch electrodes 410 comprises first touch sub-electrodes 411 which are arranged in sequence along the first direction D1 and connected with each other, and each of the second touch electrodes 420 comprises second touch sub-electrodes 421 which are arranged in sequence along the second direction D2 and connected with each other. As shown in FIG. 4, each of the first touch sub-electrodes 411 and the second touch sub-electrodes 421 has a rhombic body outline. In other examples, the first touch sub-electrodes 411 and the second touch sub-electrodes 421 can be in other shapes, such as triangle, bar, or the like.

The first touch sub-electrodes 411 adjacent to each other in the first direction D1 are electrically connected through the first connection electrode 412 to form the first touch electrode 410, and the second touch sub-electrodes 421 adjacent to each other in the second direction D2 are electrically connected through the second connection electrodes (not shown) to form the second touch electrode 420.

Each of the first touch electrodes 410 and each of the second touch electrodes 420 are insulated and crossed with each other, and form a plurality of touch units 400 at the intersections. Each touch unit comprises a portion of each of the two first touch electrodes connected at the intersection and at least a portion of each of the two second touch electrodes connected at the intersection.

For example, the right part of FIG. 3 shows an enlarged schematic view of a touch unit 400. As shown in FIG. 3, each touch unit 400 comprises a half of each of the two adjacent first touch sub-electrodes 411 and a half of each of the two adjacent second touch sub-electrodes 421, that is, the touch unit 400 evenly comprises a region of the first touch sub-electrode 411 and a region of the second touch sub-electrode 421. The intersection of the first touch sub-electrode 411 and the second touch sub-electrode 421 in each touch unit 400 (i.e., the intersection of the first connection electrode and the second connection electrode) forms a datum point for calculating the coordinates. When a finger touches a capacitance screen, the coupling between the first touch electrode and the second touch electrode near the touch point is affected to change the mutual capacitance between the two electrodes. The touch sensing signal varies with the change in capacitance of the touch screen so that the coordinates of each touch point can be calculated based on the datum point. For example, the area of each touch unit 400 is comparable with the touch area of user's finger on the touch panel. If the area of the touch unit is too large, a blind spot may occur on the panel; and if the area is too small, a false touch signal may be generated.

The average side length of each touch unit 400 is P, called as the pitch of the touch structure. For example, the size of pitch P is in a range of 3.7 mm-5 mm, such as about 4 mm, because the diameter of a human's finger touching the touch panel is around about 4 mm. For example, the size of the pitch is the same as the average side length of each first touch sub-electrode 411 and the average side length of each second touch sub-electrode 421, and is also the same as the distance between centers of adjacent two first touch sub-electrodes 411, and the distance between centers of adjacent two second touch sub-electrodes 421.

As shown in FIG. 3, each of the first touch sub-electrodes 411 and each of the second touch sub-electrodes 421 comprise a body and a plurality of interdigital structures 440. The first touch sub-electrodes 411 are nested with the adjacent second touch sub-electrodes 421 through the interdigital structures 440 in the first metal grid 50 to form a mutual capacitance. The interdigital structures can increase the perimeter of the touch sub-electrodes in the same area, so that the mutual capacitance can be effectively increased without increasing the self-capacitance (capacitance loading) of the touch sub-electrodes. In this way, the touch sensitivity is increased. For example, the shape of the bodies can be circle or rectangle; and the shape of the interdigital structures can comprise at least one of: parallelogram (e.g., rectangle), triangle, trapezoid, and hexagon.

For example, the plurality of the interdigital structures 440 are distributed around the periphery of the bodies of the touch sub-electrodes. For example, the bodies are rectangular, and three to ten second interdigital structures 112 correspond to each side, for example, six to ten second interdigital structures 112 correspond to each side. In another examples, the bodies can be circular, and the plurality of the interdigital structures 440 are evenly distributed around the periphery of the circle.

For example, as shown in FIG. 3, the adjacent first touch sub-electrodes 411 in the first direction D1 are connected through the first connection electrodes 412 to form the first touch electrode 410 extending along the first direction D1, and the adjacent second touch sub-electrodes 421 in the second direction D2 are connected through the second connection electrodes (not shown in FIG. 3) to form the second touch electrode 420 extending along the second direction D2.

FIG. 4 is an enlarged schematic view of a part in the box in FIG. 3. A touch structure 40 comprises a first metal grid electrode layer 50 and a second metal grid electrode layer 60. An insulating layer is disposed between the first metal grid electrode layer 50 and the second metal grid electrode layer 60.

By referring to FIG. 3 and FIG. 4, the first metal grid electrode layer 50 comprises a plurality of first touch sub-electrodes 411 and a plurality of first connection electrodes 412 disposed along the first direction D1, the plurality of the first touch sub-electrodes 411 and the plurality of the first connection electrodes 412 are alternately distributed and electrically connected with each other in sequence, to form a first touch electrode 410 extending along the first direction D1, namely, along the first direction D1, the adjacent first touch sub-electrodes 4111 and 4112 are electrically connected with each other through the first connection electrode 412 to form the first touch electrode 410 located in the first metal grid electrode layer 50 as shown in FIG. 3. The first metal grid electrode layer 50 further comprises a plurality of second touch sub-electrodes 421 which are disposed in sequence and spaced apart from each other along the second direction D2, in which the first direction D1 is crossed with the second direction D2. Each of the plurality of the first touch sub-electrodes 411 and each of the second touch sub-electrodes 421 are spaced apart from each other respectively, and comprise a plurality of first metal grids, respectively.

The second metal grid electrode layer 60 comprises a plurality of second connection electrodes 422 which are spaced apart from each other, and each of the plurality of the second connection electrodes 422 is electrically connected with the second touch sub-electrodes 4211 and 4212 adjacent thereto through a plurality of via-holes in the insulating layer so as to electrically connected the adjacent second touch sub-electrode 4211 and 4212 to form the second touch electrode 420 extending in the second direction D2 as shown in FIG. 3. As shown in FIG. 4, the first touch sub-electrodes 411 and the second touch sub-electrodes 421 are nested with and spaced apart from each other through the interdigital structures 440 in the first metal grid electrode layer 50. The boundary between each first touch sub-electrode 411 and a corresponding second touch sub-electrodes 421 is in a sawtooth shape due to the presence of the interdigital structure.

For example, as shown in FIG. 3, the touch structure 40 can further comprise dummy electrodes 430. The dummy electrodes 430 are nested in at least one touch sub-electrode of the plurality of touch sub-electrodes and spaced apart from the touch sub-electrode in which it is located to be insulated from each other. For example, each of the touch sub-electrodes is nested with the dummy electrode 430, or some of the plurality of touch sub-electrodes are nested with the dummy electrodes 430. For example, the at least one touch sub-electrode is the second touch sub-electrode 421. In other embodiments, the at least one touch sub-electrode can also be the first touch sub-electrode 411.

By disposing the dummy electrodes 430 which are spaced apart from and thus not electrically connected with the touch sub-electrodes, the electrode area (active area) of the touch electrode can be decreased, and the capacitance loading (self-capacitance) on the touch electrode is reduced. In this way, the loading on the touch electrode is decreased and the touch sensitivity is increased. For example, the dummy electrode 430 is in a floating state, that is, it is not electrically connected with other structures or it does not receive any electrical signal.

Figure 7:
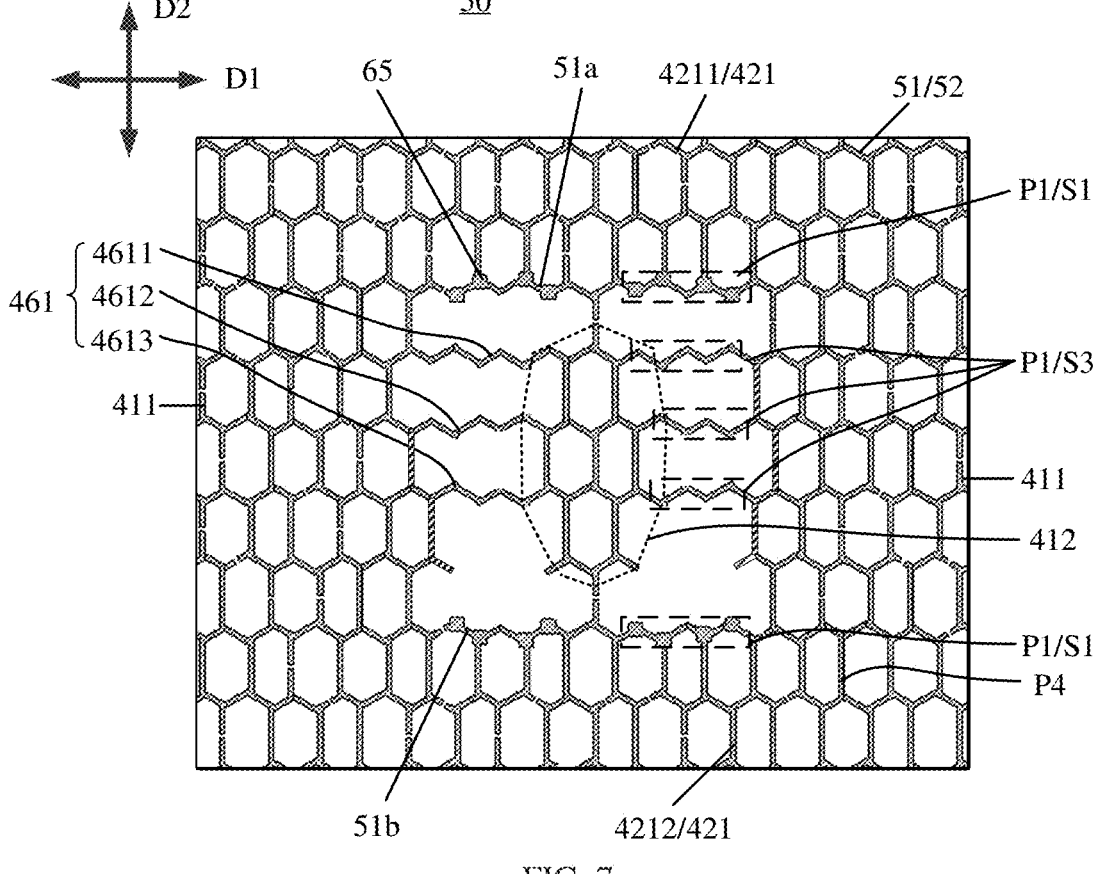
FIG. 7 shows a first metal grid electrode layer in FIG. 5.

FIG. 5 shows an enlarged schematic view of the A region as shown in FIG. 3 and FIG. 4, which is the intersection region of the first touch sub-electrode 411 and the second touch sub-electrode 421, i.e., a bridging region. The light grid in FIG. 5 shows the first metal grid 52 in the first metal grid electrode layer 50 (i.e., the first metal grid 52 in the first metal grid electrode layer 50 as shown in FIG. 7). The first metal grid electrode layer 50 comprises the first touch electrodes 410 (including the first touch sub-electrodes 411 and the first connection electrodes 412) and the second touch sub-electrodes 421. The first touch sub-electrodes 411, the first connection electrodes 412, and the second touch sub-electrodes 421 comprise a plurality of first metal grids 52 which are connected with each other, respectively. The dark grid in FIG. 5 shows the second metal grid 62 in the second metal grid electrode layer 60 (i.e., the second metal grid 62 in the second metal grid electrode layer 60 as shown in FIG. 8). The second metal grid electrode layer 60 comprises the second connection electrodes 422 which comprise a plurality of second metal grids 62 adjacent with each other.

Figure 6:
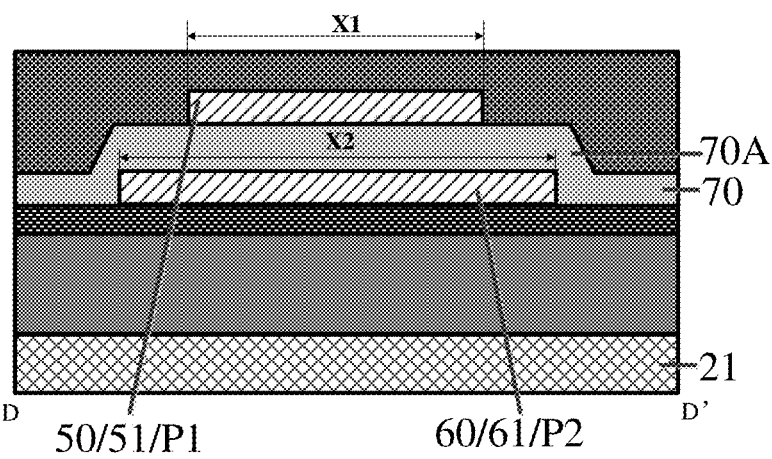
FIG. 6 is a cross-sectional view along the cutting line D-D' in FIG. 5.

FIG. 6 is a sectional view taken along the cutting line D-D' in FIG. 5; FIG. 7 shows the first metal grid electrode layer in FIG. 5; and FIG. 8 shows the second metal grid electrode layer in FIG. 5. By combining FIG. 6, FIG. 7, and FIG. 8, the touch structure 40 comprises the first metal grid electrode layer 50 and the second metal grid electrode layer 60, the first metal grid electrode layer 50 is located on a side of the second metal grid electrode layer 60 away from the substrate 21, and the insulating layer 70 is disposed between the first metal grid electrode layer 50 and the second metal grid electrode layer 60. The first metal grid electrode layer 50 comprises the plurality of the first metal grids 52 defined by the plurality of the first metal lines 51, and the second metal grid electrode layer 60 comprises the plurality of the second metal grid 62 defined by the plurality of the second metal lines 61.

For example, each of the plurality of the first metal grids 52 and each of the second metal grid 62 are polygon. For example, each of the plurality of the first metal grids 52 and each of the second metal grid 62 are hexagon. In other embodiments, the first metal grids and the second metal grids can be shaped as other polygons, such as tetragon, pentagon, triangle, or the like, and can be designed in accordance with requirements. The embodiments of the present disclosure do not limit the shape of each first metal grid 52 and each second metal grid 62, as long as they have the corresponding features in the claims.

As shown in FIGS. 5 and 6, the first portions P1 of the plurality of the first metal lines 51 (as the portions P1 circled by a plurality of dashed boxes in FIG. 7) and the second portions P2 of the plurality of the second metal lines 61 (as the portion P2 circled by a plurality of bold dashed boxes in FIG. 8) have the same line extension directions, respectively, and overlap with each other in a direction perpendicular to the surface of the substrate 21. FIG. 5 shows the overlapping portions G. The insulating layer 70 includes edge slope parts 70A which cover the second portions P2 of the plurality of the second metal lines 61 in a direction perpendicular to the line extension direction. Each edge slope part 70A forms a step relative to the surface of the substrate 21, namely, various portions of the edge slope parts 70A have different distances from the substrate 21. The first portions P1 of the plurality of the first metal lines 51 at least partly do not overlap with the edge slope parts 70A so that the probability of short circuit caused by the electrical connection between the first portions P1 of the plurality of the first metal lines 51 with the second portions P2 of the plurality of the second metal lines 61 due to the breakage in the edge slope parts 70A can be reduced so as to improve the reliability of the touch structure.

For example, in some embodiments, the first portions P1 of the plurality of the first metal lines 51 completely do not overlap with the edge slope parts 70A so that the probability of short circuit caused by the electrical connection between the first portions P1 of the plurality of the first metal lines 51 with the second portions P2 of the plurality of the second metal lines 61 due to the breakage in the edge slope parts 70A can be reduced so as to improve the reliability of the touch structure.

For example, as shown in FIG. 6, in a plane parallel to the surface of the substrate, a line width X2 of the second portions P2 of the plurality of the second metal lines 61 is greater than the line width X1 of the first portions P1 of the plurality of the first metal lines 51, so that the first portions P1 of the plurality of the first metal lines 51 at least partly do not overlap with the edge slope parts 70A.

For example, the orthographic projections of the first portions P1 of the plurality of the first metal lines 51 on the substrate 21 are within the orthographic projections of the second portions P2 of the plurality of the second metal lines 61 on the substrate 21, so that the first portions P1 of the plurality of the first metal lines 51 completely do not overlap with the edge slope parts 70A.

For example, as shown in FIG. 7, the first portions P1 of the plurality of the first metal lines 51 comprises a plurality of first metal sub-lines (e.g., each of the first metal sub-lines is substantially in a "W-like" shape, or a portion of "W-like" shape). As shown in FIG. 8, the second portions P2 of the plurality of the second metal lines 61 comprises a plurality of second metal sub-lines (e.g., each of the second metal sub-lines is substantially in a "W-like" shape, or a portion of "W-like" shape). The plurality of the first metal sub-lines 51 and the plurality of the second metal sub-lines 52 overlap with each other in a direction perpendicular to the surface of the substrate 21, and the overlapping portions are shown as the plurality of fold lines G arranged in spacing in FIG. 5 (as described below in details).

For example, as shown in FIG. 7, the first portions P1 of the plurality of the first metal sub-lines 51 comprise the first sub-portions S1 located at side ends of the first touch sub-electrodes near the second connection electrodes. As shown in FIG. 8, the second portions P2 of the plurality of the second metal sub-lines 61 comprise the second sub-portions S2 at side ends of the second connection electrodes near the first touch sub-electrodes. In a direction perpendicular to the surface of the substrate 21, the first sub-portions S1 overlap with the second sub-portions S2, and the first sub-portions S1 are electrically connected with the second sub-portions S2 through a plurality of via-holes in the insulating layer 70 (e.g., the plurality of via-holes 71 and the plurality of via-holes 72, which will be described in details later)

For example, as shown in FIG. 7, the first portions P1 of the plurality of the first metal sub-lines 51 further comprises the third sub-portions S3 located in the first connection electrodes. The second portions P2 of the plurality of the second metal sub-lines 61 further comprises the fourth sub-portions S4 located in the second connection electrodes. In a direction perpendicular to the surface of the substrate 21, the third sub-portions S3 and the fourth sub-portions S4 overlap with and are electrically insulated from each other, for example, the third sub-portions S3 and the fourth sub-portions S4 are electrically insulated by the insulating layer 70 therebetween.

For example, in some embodiments, as shown in FIG. 6, the ratio of the line width X2 of the second portions P2 of the plurality of the second metal lines 61 to the line width of the first portions P1 of the plurality of the first metal lines 51 is R1, where $2 \geq R1 > 1$.

For example, in some embodiments, the line width X1 of each of the plurality of the first metal lines 51 is 3 μm-5 μm, such as 3.5 μm, 4 μm, or 4.5 μm, etc., and the line width X2 of the second portions P2 of the plurality of the second metal lines 61 is 0.2 μm-0.5 μm, such as 0.3 μm or 0.4 μm, greater than the line width X1 of the first metal lines.

For example, as shown in FIG. 8, the plurality of the second metal lines 61 further have the third portions P3 which do not overlap with the plurality of the first metal lines 51, e.g., the third portions P3 of the plurality of the second metal lines 61 comprise the connection portions S5 between the second sub-portions S2 and the fourth sub-portions S4.

For example, the ratio of the line width of the third portions P3 of the plurality of the second metal lines 61 to the line width of the first portions P1 of the plurality of the first metal lines 51 is R2, where $1 > R2 \geq 0.6$.

For example, the line width of the third portions P3 of the plurality of the second metal lines 61 is 0.2 μm-0.5 μm, such as 0.3 μm or 0.4 μm, less than the line width of the first metal lines 51.

For example, in an example, the line width of each of the plurality of the first metal lines 51 is 3 μm, the line width of the second portions P2 of the second metal lines 61 is 3.2 μm, and the line width of the third portions P3 of the second metal lines 61 is 2.8 μm. In this way, on the basis of avoiding the short circuit caused by the electrical connection between the first portions P1 of the plurality of the first metal lines 51 with the second portions P2 of the plurality of the second metal lines 61 due to the breakage in the edge slope parts 70A, it can further optimize the circuit patterns of the first metal lines 51 and the second metal lines 61, and the accuracy and sensitivity of the touch structure are thus increased.

For example, in other embodiments, the line width of each of the plurality of the second metal lines 61 is 2.5 μm-4.5 μm, such as 3 μm, 3.5 μm, or 4 μm, etc. The line width of the first portions P1 of the plurality of the first metal lines 51 is 0.2 μm-0.5 μm, such as 0.3 μm or 0.4 μm, less than the line width of the second metal line 61. For example, as shown in FIG. 7, the plurality of the first metal lines 51 further include the fourth portions P4 which do not overlap with the plurality of the second metal lines 61. The line width of the fourth portions P4 of the plurality of the first metal lines 51 is greater or less than the line width of the second metal line 61, and the embodiments of the present disclosure do not limit the line width of the fourth portions P4.

For example, as shown in FIG. 5, FIG. 7, and FIG. 8, the first portion P1 of the plurality of the first metal lines 51, or the second portions P2 of the plurality of the second metal lines 61, or the overlapping portions of the first portions P1 of the plurality of the first metal lines 51 and the second portions P2 of the plurality of the second metal lines 61 are in a shape of a plurality of fold lines G arranged in spacing.

For example, in some embodiments, as shown in FIG. 5 and FIG. 8, each of the plurality of the second connection electrodes 422 comprises, along the second direction, the first metal grid row 1 and the second metal grid row 2. The first metal grid row 1 comprises the plurality of the second metal grids 62 arranged along the first direction D1. The second metal grid row 2 and the first metal grid row 1 are adjacent to and connected with each other, and the second metal grid row 2 comprises at least one second metal grid 62 arranged along the first direction D1. The amount of the second metal grids 62 in the second metal grid row 2 is less than or equal to the amount of the second metal grids 62 in the first metal grid row 1, and the second metal lines 61 of the second metal grids 62 in the second metal grid row 2 near the first metal grid row 1 are the second metal lines 611 shared with the second metal grids 62 in the first metal grid row 1.

For example, referring to FIG. 5, the second metal lines 611 that the second metal grid row 2 and the first metal grid row 1 share are in a shape of the first fold line G1, and the plurality of the fold lines G arranged in spacing comprise the first fold line G1.

For example, as shown in FIG. 8, the first metal grid row 1 further comprises the first unshared second metal line 61a opposite to the shared second metal line 611. Referring to FIG. 5, the first unshared second metal line 61a is in a shape of second fold line G2, and the plurality of fold lines G arranged in spacing comprises the second fold line G2.

In the touch structure provided in the embodiment of the present disclosure 40, the second metal lines 61 of the second metal grid 62 in the second metal grid row 2 near the first metal grid row 1 are the second metal lines 611 shared with the second metal grid 62 in the first metal grid row 1, and thus, in addition to the second metal lines 61 shared with the first metal grid row 1, the second metal grid row 2 near the first metal grid row 1 does not comprise any additional second metal line overlapping with the second metal line, so that the overlapping area of the first metal lines 51 and the second metal lines 61 is reduced, the overlapping area of the first touch electrode 410 and the second touch electrode 420 is reduced. In this way, the mutual capacitance between the first touch electrode 410 and the second touch electrode 420 is reduced, the touch performance is improved, the occurrence of false report and false touch are reduced, and the power consumption of the touch circuit is reduced.

For example, in some embodiments, two second metal grids 62 in the first metal grid row 1 are provided, one second metal grid in the second metal grid row 2 is provided, so as to ensure that the second connection electrodes 422 comprises as few second metal grids as possible while ensuring that the second grid row 2 provides at least two electrical signal transmission paths along the second direction D2, so that the overlapping between the first metal lines 51 and the second metal lines 62 is minimum. The at least two electrical signal transmission paths can be, e.g., the first paths 621 and the second paths 622 as shown by grey lines in FIG. 8.

FIG. 9 shows a schematic sectional view taken along the line B-B' in FIG. 5. By combining FIG. 5 and FIG. 9, for example, the plurality of via-holes in the insulating layer 70 comprise the first via-holes 71 located at the turning positions of the second fold lines G2 of the first unshared second metal line 61a, and the first metal grid row 1 is electrically connected with the second touch sub-electrode 4211 of one of the two second touch sub-electrodes 4211/4212 adjacent to the second connection electrode 422 where the first metal grid row is located through the first via-holes 71.

For example, as shown in FIG. 5 and FIG. 9, the orthographic projections of the plurality of the second metal lines 61 of the second metal grids 62 of the first metal grid row 1 (e.g., at least two metal grids 62) on the first metal grid electrode layer 50 overlap with the plurality of the first metal lines 51 of the first metal grids 52 of the second touch sub-electrode 421, so that each second metal grid 62 comprises a plurality of vertexes overlapping with the first metal grid 52, the vertexes are located in the turning positions of the second fold lines G2. For example, in this embodiment, five plurality of the vertexes are provided, that is, the first vertex 01, the second vertex 02, the third vertex 03, the fourth vertex 04, and the fifth vertex 05, respectively, and the via-holes 71 are disposed at sites of the first vertex 01, the second vertex 02, the fourth vertex 04, and the fifth vertex 05, which are used to electrically connected the first portions P1 of the plurality of the first metal lines 51 and the second portions P2 of the plurality of metal lines 61.

FIG. 10 is a schematic view of the vertex with a via-hole and the vertex without a via-hole in the second metal grid. For example, the left part of FIG. 10 shows an example of the vertex 03 without any via-hole of the second metal grid 62, and the right part of FIG. 10 shows an example of the vertexes 01/02/04/05 with the via-holes 71 in the second metal grid 62. As shown in FIG. 10, for forming good contact between the second metal line 61 and the first metal line 51 at the site of the connecting vertex through the via-holes 71, the second metal grid electrode layer 60 forms a metal contact pad 65 at the sites of the vertex 01/02/04/05. For example, the metal contact pad is in a shape of rectangle or circle, and the size of the metal contact pad (average length of side or diameter) is twice or more of the line width of the first metal lines 51 or the second metal lines 61.

For example, the plurality of the second metal grids 62 of the first metal grid row 1 are the first edge second metal grids of the second connection electrodes, which are located at the first ends of the second connection electrodes 422 in the second direction D2 (the upper end in the figure), and electrically connected with the edge first metal grids of the adjacent second touch sub-electrodes 4211. Namely, the edge second metal lines 61*a* of the second metal grids 62 of the first metal grid row 1 are connected with the edge first metal lines 51*a* of the adjacent second touch sub-electrodes 4211 which are nearest to the first metal grid row 1, respectively. This configuration can minimize the overlapping between the second touch sub-electrodes 4211 and the second connection electrodes 422, reduce the capacitance loading on the touch sub-electrodes, and improve the touch sensitivity.

For example, as shown in FIG. 5, FIG. 7, and FIG. 8, each of the plurality of the second connection electrodes 422 further comprises, along the second direction D2, the third metal grid row 3, and the fourth metal grid row 4. The third metal grid row 3 is located on a side of the second metal grid row 4 away from the first metal grid row 1, and the third metal grid row 3 comprises the plurality of the second metal grids 62 arranged along the first direction D1; the fourth metal grid row 4 is located on a side of the third metal grid row 3 near the second metal grid row 2, the fourth metal grid row 4 is adjacent to and connected with the third metal grid row 3, and the fourth metal grid row 4 comprises at least one second metal grid 62 arranged along the first direction D1. The amount of the second metal grids 62 in the fourth metal grid row 4 is less than the amount of the second metal grids in the third metal grid row 3, and the second metal lines 612 of the second metal grids 62 in the fourth metal grid row 4 near the third metal grid row 3 are the second metal lines 612 shared with the second metal grids 62 in the third metal grid row 3.

For example, the third metal grid row 3 further comprises the second unshared second metal lines 61*b* opposite to the second metal lines 612 that the fourth metal grid row 4 and the third metal grid row 3 share. Referring to FIG. 5, the second unshared second metal lines 61*b* are in a shape of a third fold line G3, and the plurality of fold lines G arranged in spacing comprise the third fold line G3.

For example, as shown in FIG. 9, the plurality of via-holes in the insulating layer 70 further comprise the second via-holes 72 located at the turning positions of the third fold lines G3 of the second unshared second metal lines 61*b*. The third metal grid row 3 is electrically connected with the other one 4212 of the two second touch sub-electrodes adjacent to the second connection electrode 422 where the third metal grid row is located through the second via-holes 72.

For example, as shown in FIG. 5, the third fold lines G3 of the second unshared second metal lines 61*b* have five vertexes, that is, the sixth vertex 01', the seventh vertex 02', the eighth vertex 03', the ninth vertex 04', and the tenth vertex 05', respectively, and the sixth vertex 01', the seventh vertex 02', the ninth vertex 04', and the tenth vertex 05' are provided with the second via-holes 72 to electrically connect the first portions P1 of the plurality of the first metal lines 51 with the second portions P2 of the plurality of metal lines 61.

In the touch structure 40 provided in the embodiment of the present disclosure, the second metal lines 61 of the second metal grids 62 in the fourth metal grid row 4 near the third metal grid row 3 are the second metal lines 612 shared with the second metal grids 62 in the third metal grid row 3, and thus, in addition to the second metal lines 61 shared with the third metal grid row 3, the fourth metal grid row 4 near the first metal grid row 1 does not comprise any additional second metal line overlapping with the first metal lines 51 so as to reduce the overlapping area between the first metal lines 51 and the second metal lines 61. In this way, the overlapping area of the first touch electrode 410 and the second touch electrode 420 is reduced, which can further achieve a technical effect of reducing the mutual capacitance between the first touch electrode 410 and the second touch electrode 420, decrease the power consumption of the touch circuit, and reduce the occurrence probability of short circuit between the first metal lines 51 and the second metal lines 61.

For example, the second metal grids 62 of the third metal grid row 3 are the second edge second metal grids of the second connection electrodes 422, which are located at the second ends of the second connection electrodes 422 in the second direction, and are electrically connected with the edge first metal grids of the adjacent second touch sub-electrodes 4212, and the second ends are opposite to the first ends in the second direction D2. That is, the edge second metal lines 61*b* of the second metal grids 62 of the third metal grid row 3 are connected with the edge first metal lines 51*b* of the adjacent second touch sub-electrodes 4212 which are nearest to the third metal grid row 3. This configuration can minimize the overlapping between the second touch sub-electrodes 4212 and the second connection electrodes 422, so as to reduce the capacitance loading on the touch sub-electrodes and improve the touch sensitivity.

By combining FIG. 5, FIG. 7 and FIG. 8, for example, the orthographic projections of the second metal lines 612 shared with the second metal grids 62 in the third metal grid row 3 on the first metal grid electrode layer 50 do not overlap with the first metal lines 51, namely, no first metal line 51 is disposed at the position in the first metal layer 50 corresponding to the shared second metal lines 612, so as to minimize the overlapping area of the first metal lines 51 and the second metal lines 62, and a problem caused by large overlapping area between the first metal lines 51 and the second metal lines 62 can be avoided.

For example, two second metal grids in the third metal grid row are provided, and one second metal grid in the fourth metal grid row is provided, so that the overlapping between the first metal lines 51 and the second metal lines 62 can be minimized as much as possible on the basis of ensuring that the signal can be transmitted through the second connection electrode 422. In this case, along the second direction D2, each of the second electrodes 422 comprises at least two electrical signal transmission paths.

For example, the second connection electrodes 422 further comprises at least one intermediate metal grid row located between the second metal grid row 2 and the fourth metal grid row 4, and each of the at least one intermediate metal grid row comprises at least one second metal grid 62. For example, in some embodiments, as shown in FIG. 8, one intermediate metal grid row is provided, that is, the fifth grid row 5. The fifth grid row 5 is adjacent to and connected with the second metal grid row 2 and the fourth metal grid row 4.

For example, as shown in FIG. 8, the at least one intermediate metal grid row (e.g., the fifth grid row 5) comprises the second metal line 613 shared with the second metal grid row 2 or the fourth metal grid row 4. Referring to FIG. 5, the second metal line that the at least one intermediate metal grid row and the second metal grid row 2 or the fourth metal grid row 4 share is in a shape of a fourth fold line G4, and the plurality of fold lines G arranged in spacing comprise the fourth fold lines G4.

For example, one second metal grid in each of the at least one intermediate metal grid row is provided. For example, the fifth grid row 5 comprises only one second metal grid, so that the second connection 422 comprise as few second metal grid as possible while ensuring that the fifth grid row 5 provides at least two electrical signal transmission paths along the second direction D2, and the overlapping between the first metal lines 51 and the second metal lines 62 is minimized.

For example, the patterns of each of the plurality of the second connection electrodes 422 are symmetrical with respect to the symmetrical axis along the first direction D1 so as to facilitate the uniformity of the touch signaling which is transduced through the second connection electrodes 422.

For example, as shown in FIG. 8, each second metal grid 62 comprises at least two vertical edges 61c along the second direction D2 to enable each row of the second metal grids to provide at least two electrical signal transmission paths along the second direction D2. In this way, when a vertical edge 61c is at a risk of disconnection, it is feasible to prevent occurrence of touch dead pixels and ensure the reliability of the touch function. For example, the ortho-graphic projections of the at least two vertical edges 61c on the first metal grid electrode layer 50 do not overlap with the first metal lines 51 (i.e., the vertical edges 61c are imple-mented as the third portions P3 of the plurality of the second metal lines), so as to reduce the overlapping between the first metal lines 51 and the second metal line 62 as possible.

For example, as shown in FIG. 5 and FIG. 8, the adjacent second touch sub-electrodes 4211 and 4212 are electrically connected with each other through two second connection electrodes 422, that is, one second connection electrode 422 in the left part of FIG. 8 and one second connection electrode 422 in the right part of FIG. 8. The two second connection electrodes 422 are spaced apart from each other. For example, the two second connection electrodes 422 can be symmetrically distributed in configuration. Combining FIG. 5 and FIG. 7, the orthographic projection of each of the plurality of the first connection electrodes 412 on the second metal grid electrode layer 60 is located in the gap between the two second connection electrodes 422 connecting the adjacent second touch sub-electrodes 4211 and 4212.

Combining FIG. 5 and FIG. 7, for example, each of the plurality of the first touch sub-electrodes 421 are electrically connected with the adjacent first connection electrode 412 through at least one first connection line 464 which is constituted by the plurality of the first metal lines 51 connected head to tail in turn. The orthographic projections of the first connection lines 461 on the second metal grid electrode layer 60 overlap with the plurality of the second metal lines in the second connection electrodes 422, and at least partly overlap with the orthographic projections of the shared second metal line 611 on the first metal grid electrode layer 50. For example, in the embodiments as shown in FIG. 5, FIG. 7, and FIG. 8A, the first touch sub-electrode 411 in the left part of the figure is electrically connected with the first connection electrode 412 through three first connection lines 4611, 4612, 4613. A portion of the orthographic projection of the first connection line 4611 on the second metal grid electrode layer 60 overlaps with the second metal line 611 that the first metal grid row 1 and the second metal grid row 2 share on the left part of the figure, so as to minimize the overlapping area between the first metal line 51 and the second metal line 62, and to avoid a problem caused by large overlapping area between the first metal line 51 and the second metal line 62.

The first portions of the plurality of the first metal lines at least partly do not overlap with the edge slope parts in the touch structure provided in the embodiment of the present disclosure, it is feasible to reduce the probability of short circuit caused by the electrical connection between the first portions of the first metal lines with the second metal lines due to the breakage of the edge slope parts, and the reli-ability of the touch structure is increased. The touch struc-ture can be combined into a display panel, so as to form a touch display panel.

At least one embodiment of the present disclosure pro-vides a touch display panel comprising a base substrate, and a display structure and any touch structure as described above which are stacked on the base substrate.

Figure 11:
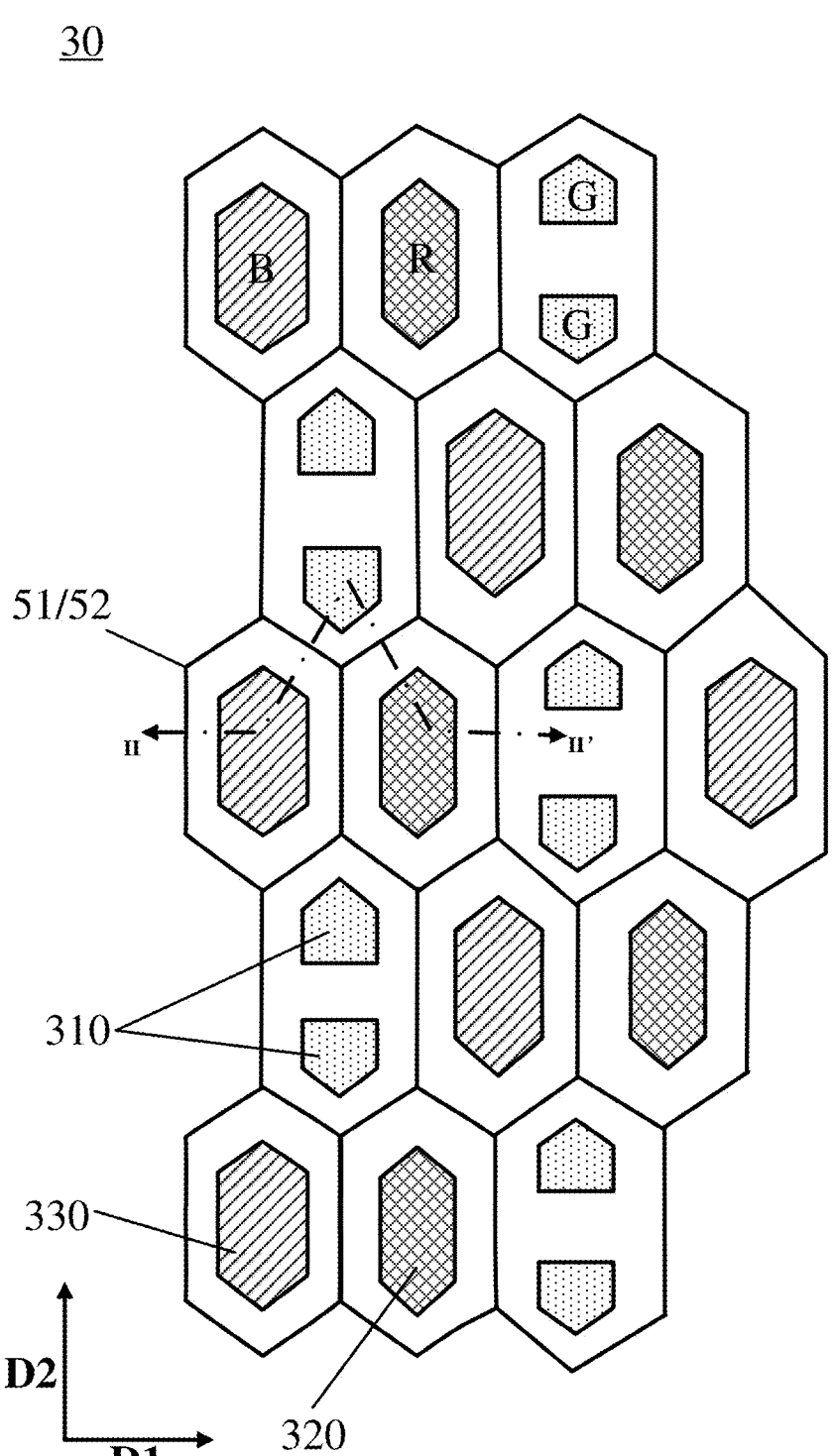
FIG. 11 is a schematic planar view of a touch display panel provided in at least one embodiment of the present disclosure.
Figure 12:
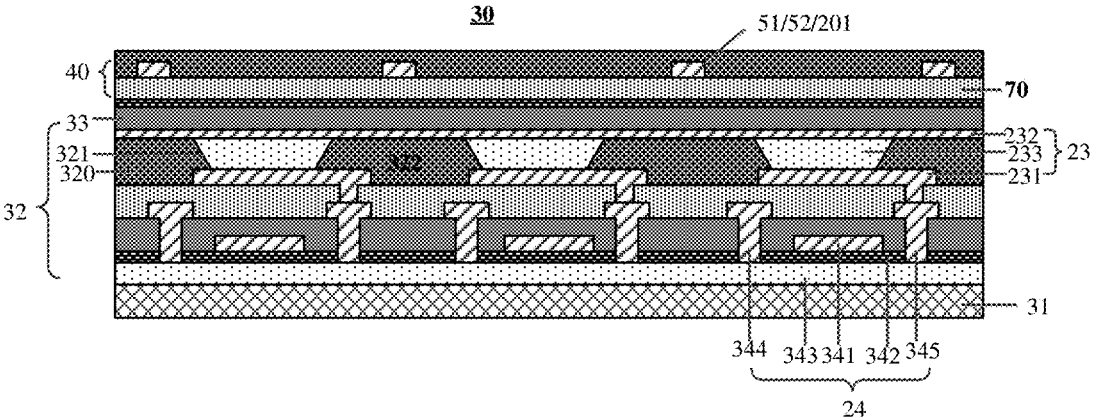
FIG. 12 is a cross-sectional view along the cutting line II-II' in FIG. 11.

FIG. 11 shows a schematic planar view of the touch display panel 30 provided in at least one embodiment of the present disclosure; and FIG. 12 shows a sectional view taken along the cutting line II-II' in FIG. 11.

By referring to FIG. 11 and FIG. 12, the touch display panel 30 comprises a base substrate 31, and a display structure 21 and the above-described touch structure 40 which are stacked on the base substrate 31 in sequence. The touch structure 40 is located on a side of the display structure 32 away from the base substrate 31, and the touch structure is closer to the user during use. The first metal grid electrode layer 50 is located on a side of the second metal grid electrode layer touch structure 40 away from the display structure 32, namely, the first metal grid electrode layer 50 is closer to the observer compared with the second metal grid electrode layer 60, which avoids more first metal grids close to the pixel structure of the display structure to affect the operation of the pixel structure.

For example, the embodiment is described by using an OLED display panel as an example of the display panel. In other embodiments, the display panel can be a liquid crystal display panel, such as On-cell or In-cell touch display panel. The embodiments of the present disclosure do not limit the particular type of the display panel using the touch structure provided in the embodiments of the present disclosure.

For example, the display structure 32 comprises a plural-ity of sub-pixels arranged in an array, for example, the pixel array is arranged along the first direction D1 and the second direction D2. For example, the touch display panel is an OLED display panel, the plurality of the sub-pixels com-prise green sub-pixels (G), red sub-pixels (R), and blue sub-pixels (B). Each sub-pixel comprises a light-emitting element 23 and a pixel drive circuit for driving the light-emitting element 23 to emit a light. The embodiments of the present disclosure do not limit the type and particular compositions of the pixel drive circuit. For example, the pixel drive circuit can be either current-driven or voltage-driven, it can be 2T1C (i.e., two transistors including a drive transistor and a data writing transistor, and one capacitance) drive circuit, it can further comprises, on the basis of 2T1C, a drive circuit including a compensation circuit (compensa-tion transistor), a light-emitting control circuit (light-emit-ting control transistor), reset circuit (reset transistor), etc.

For clarity, FIG. 12 merely shows the first transistor 24 which is directly electrically connected with the light-emitting element 23 which can be a drive transistor config-ured to operate under a saturated state and control the current magnitude for driving the light-emitting element 23 to emit a light. For example, the first transistor 24 can also be a light-emitting control transistor for controlling the current for driving the light-emitting element 23 to emit a light to flow through or not. The embodiments of the present disclosure do not limit the particular types of the first transistor.

For example, the light-emitting element 23 is an organic light-emitting diode comprising a first electrode 231, a light-emitting layer 233, and a second electrode 232. One of the first electrode 231 and the second electrode 232 is an anode, and the other is a cathode. For example, the first electrode 231 is an anode, and the second electrode 232 is a cathode. For example, the light-emitting layer 233 is an organic light-emitting layer or a quantum dot light-emitting layer. For example, in addition to the light-emitting layer 233, the light-emitting element 23 can further comprise auxiliary functional layers, such as a hole injection layer, a hole transmission layer, an electron injection layer, an electron transmission layer, etc. For example, the light-emitting element 23 is a top-emission structure, the first electrode 231 is reflective, and the second electrode 232 is transmissive or semi-transmissive. For example, the first electrode 231 is made from a material with high work function so as to serve as an anode, such as an ITO/Ag/ITO stack structure; the second electrode 232 is made from a material with low work function so as to serve as a cathode. For example, the second electrode 232 is made from a semi-transmissive metallic material or an alloy, such as an Ag/Mg alloy.

The first transistor 24 comprises a gate electrode 341, a gate electrode insulating layer 342, an active layer 343, a first electrode 344, and a second electrode 345, the second electrode 345 is electrically connected with the first electrode 231 of the light-emitting element 23. The embodiments of the present disclosure do not limit the type, material, structure of the first transistor 24. For example, the first transistor can be top-gate type, bottom-gate type, etc. The active layer 343 of the first transistor 24 can be made from amorphous silicon, polycrystalline silicon (low-temperature polycrystalline silicon and high-temperature polycrystalline silicone), oxide semiconductor (e.g., Indium Gallium Tin oxide (IGZO)), etc., and the first transistor 24 can be N-type or P-type.

All the transistors used in the embodiments of the present disclosure can be thin film transistors, field effect transistors, or other switching devices with the same characteristics, and the embodiments of the present disclosure are illustrated by using thin film transistors as examples. The source and drain electrodes of the transistor as used herein can be symmetrical in structure, and thus the source and drain electrodes thereof can be no difference in structure. In the embodiments of the present disclosure, for distinguishing the two electrodes other than the gate electrode, one electrode therein is described as the first electrode, and the other electrode is described as the second electrode.

By combining FIG. 11 and FIG. 12, the display structure 32 further comprises a pixel definition layer 320 disposed on the first electrode 231 of the light-emitting element 23, in which a plurality of openings 321 are formed and expose the first electrodes 231 of the plurality of sub-pixels, respectively, so as to define the pixel opening region of each sub-pixel. The light-emitting region of the sub-pixel is formed in the pixel opening region, and the second electrode 232 is formed as a common electrode (that is, the second electrode is shared by the plurality of the sub-pixels). FIG. 11 schematically shows the pixel opening region 310 of the green sub-pixels, the pixel opening region 320 of the red sub-pixels, and the pixel opening region 330 of the blue sub-pixels.

FIG. 12 does not show the pattern in the second metal grid electrode layer. For example, the second metal grid electrode layer is located on a side of the first metal grid electrode layer near the base substrate 31.

The orthographic projections of the plurality of the first metal lines 51 in the first metal grid electrode layer and the plurality of the second metal lines 61 in the second metal grid electrode layer are located outside the orthographic projections of the pixel opening regions of the plurality of the sub-pixels on the base substrate 31, i.e., falling within the orthographic projections of the pixel partition regions between the pixel opening regions on the base substrate 31, in which the pixel partition regions are the non-opening regions 322 of the pixel definition layer 320. The pixel partition regions are used to separate the pixel opening regions of the plurality of the sub-pixels so as to isolate the light-emitting layers of various sub-pixels to prevent cross-color.

For example, the mesh openings of the first metal grids 52 or the second metal grids 62 cover at least one pixel opening region. For example, the mesh openings of the first metal grids 52 or the second metal grids 62 cover the pixel opening regions 310 of two green sub-pixels which are disposed in pair, and the pixel opening regions 310 of two green sub-pixels are arranged in parallel along the second direction D2.

As shown in FIG. 12, the display structure 32 further comprises a packaging layer 33 located between the light-emitting element 23 and the touch structure 20, which is configured to seal the light-emitting element 23 to prevent the permeation of external moisture and oxygen into the light-emitting element and the drive circuit which may result in damage of devices including the light-emitting element 23 or the like. For example, the packaging layer 33 can be a single layer structure or a multi-layer structure. For example, the packaging layer 33 may be a multi-layer structure including organic films, inorganic films, or a stack structure of alternate organic and inorganic films.

For example, as shown in FIG. 12, the touch display panel 30 further comprises a buffer layer 22 located between the display structure 32 and the touch structure 20. For example, the buffer layer 22 is formed on top of the packaging layer 33 for improving the adhesion between the touch structure 40 and the display structure 32. For example, the buffer layer 22 is an inorganic insulating layer. For example, the buffer layer 22 may include material of silicon nitride, silicon oxide, or silicon oxy-nitride. For example, the buffer layer 22 can also comprise a stack structure of alternate silicon oxide and silicon nitride.

The touch display panel provided in the embodiments of the present disclosure have both the touch function and the display function, and have all the technical effects of the above touch structure 40, which are not repeated here.

At least one embodiment of the present disclosure also provides a display device comprising the above touch display panel 30. For example, the display device is an organic light-emitting display (OLED) device or a liquid crystal display device.

For example, the display device can be any product or component with display and touch functions, such as display, OLED panel, OLED television, electronic paper, mobile phone, tablet computer, laptop, digital photo frame, navigator, or the like.

The following points should be noted:

1) The accompanying drawings involve only the structure(s) in connection with the embodiment(s) of the present disclosure, and other structure(s) can be referred to common design(s).

2) For the purpose of clarity, in accompanying drawings for illustrating the embodiment(s) of the present disclosure, the thickness of a layer or area may be enlarged or narrowed, that is, the drawings are not drawn in a real scale. It can be understood that when an element, such as layer, film, region, substrate, or the like, is referred to as being "on" or "under" another element, this element can be "directly" located "on" or "under" another element, or there can be an intermediate element therebetween.

3) Without conflicting with each other, embodiments and features in the embodiments can be combined with each other to obtain new embodiments.

The described above is related to the specific implementations of the disclosure only and not limitative to the scope of the disclosure; the scopes of the disclosure are defined by the claims.

What is claimed is:

1. A touch structure, comprising a substrate and a first metal grid electrode layer, an insulating layer, and a second metal grid electrode layer on the substrate, wherein the first metal grid electrode layer is located on a side of the second metal grid electrode layer away from the substrate, the insulating layer is disposed between the first metal grid electrode layer and the second metal grid electrode layer;

the first metal grid electrode layer comprises a plurality of first metal grids formed by a plurality of first metal lines, the second metal grid electrode layer comprises a plurality of second metal grid formed by a plurality of second metal lines, first portions of the plurality of the first metal lines and second portions of the plurality of the second metal lines have same line extension directions, respectively, and overlap with each other in a direction perpendicular to a surface of the substrate, wherein the first portions of the plurality of the first metal lines comprise a plurality of first metal sub-lines, the second portions of the plurality of the second metal lines comprise a plurality of second metal sub-lines, the plurality of the first metal sub-lines and the plurality of the second metal sub-lines overlap with each other in a direction perpendicular to the surface of the substrate, and a smallest distance between an edge of each first metal sub-line and an edge of a corresponding second metal line is larger than zero.

2. The touch structure according to claim 1, wherein, in a plane parallel to the surface of the substrate, a line width of each second portion of the plurality of the second metal lines is greater than a line width of each first portion of the plurality of the first metal lines; and orthographic projections of the first portions of the plurality of the first metal lines on the substrate are within orthographic projections the second portions of the plurality of the second metal lines on the substrate.

3. The touch structure according to claim 1, wherein the first metal grid electrode layer comprises a plurality of first touch sub-electrodes and a plurality of first connection electrodes disposed along a first direction, the plurality of the first touch sub-electrodes and the plurality of the first connection electrodes are alternately distributed and electrically connected in sequence to form the first touch electrode extending along the first direction; the first metal grid electrode layer further comprises a plurality of second touch sub-electrodes which are disposed in sequence and spaced apart from each other along a second direction, the first direction crosses with the second direction; each of the plurality of the first touch sub-electrodes and each of the second touch sub-electrodes are spaced apart from each other, and each of the plurality of the first touch sub-electrodes and the second touch sub-electrodes comprises the plurality of the first metal grids;

the second metal grid electrode layer comprises a plurality of second connection electrodes which are spaced apart from each other, each of the plurality of the second connection electrodes is electrically connected with an adjacent second touch sub-electrode through a plurality of via-holes in the insulating layer, so that the adjacent second touch sub-electrodes are electrically connected to form the second touch electrode extending in the second direction.

4. The touch structure according to claim 3, wherein first portions of the plurality of the first metal sub-lines comprises first sub-portions located at side ends of the first touch sub-electrodes near the second connection electrodes, second portions of the plurality of the second metal sub-lines comprises second sub-portions located at side ends of the second connection electrodes near the first touch sub-electrodes, and in a direction perpendicular to the surface of the substrate, the first sub-portions overlap with the second sub-portions, and the first sub-portions are electrically connected with the second sub-portions through a plurality of via-holes in the insulating layer.

5. The touch structure according to claim 4, wherein the first portions of the plurality of the first metal sub-lines further comprises third sub-portions located in the first connection electrodes, and the second portions of the plurality of the second metal sub-lines further comprises fourth sub-portions located in the second connection electrodes, in a direction perpendicular to the surface of the substrate, the third sub-portions overlap and are electrically insulated from the fourth sub-portions.

6. The touch structure according to claim 5, wherein a ratio of the line width of the second portions of the plurality of the second metal lines to the line width of the first portions of the plurality of the first metal lines is R1, where $2 \geq R1 > 1$.

7. The touch structure according to claim 6, wherein each of the plurality of the first metal lines has a line width of 3 μm-5 μm, and the line width of the second portions of the plurality of the second metal lines is 0.2 μm-0.5 μm greater than the line width of the first metal lines.

8. The touch structure according to claim 7, wherein the plurality of the second metal lines further include third portions which do not overlap with the plurality of the first metal lines, wherein a ratio of the line width of the third portions of the plurality of the second metal lines to the line width of the first portions of the plurality of the first metal lines is R2, where $1 > R2 \geq 0.6$; and wherein the line width of the third portions of the plurality of the second metal lines is 0.2 μm-0.5 μm less than the line width of the first metal lines; and the third portions of the plurality of the second metal lines comprises connection portions between the second sub-portions and the fourth sub-portions.

9. The touch structure according to claim 6, wherein each of the plurality of the second metal lines has a line width of 2.5 μm-4.5 μm, and the line width of the first portions of the plurality of the first metal lines is 0.2 μm-0.5 μm less than the line width of the second metal lines.

10. The touch structure according to claim 9, wherein the plurality of the first metal lines further include fourth portions that do not cross with the plurality of the second metal lines, and a line width of the fourth portions of the plurality of the first metal lines is greater or less than the line width of the second metal line.

11. The touch structure according to claim 3, wherein the second portions of the plurality of the second metal lines as a whole are in a shape of a plurality of fold lines arranged in spacing.

12. The touch structure according to claim 11, wherein each of the plurality of the second connection electrodes along the second direction comprise:

a first metal grid row comprising the plurality of the second metal grids arranged along the first direction; and a second metal grid row which is adjacent to and connected with the first metal grid row and comprises at least one second metal grid arranged along the first direction, wherein the amount of the second metal grids in the second metal grid row is less than or equal to the amount of the second metal grids in the first metal grid row, and the second metal lines of the second metal grids in the second metal grid row near the first metal grid row are second metal lines shared with the second metal grids in the first metal grid row.

13. The touch structure according to claim 12, wherein the second metal lines that the second metal grid row and the first metal grid row share are in a shape of a first fold line, and the plurality of fold lines arranged in spacing comprise the first fold line;

the first metal grid row further comprises first unshared second metal lines opposite to the shared second metal line, and the first unshared second metal lines are in a shape of a second fold line, and the plurality of fold lines arranged in spacing comprise the second fold line.

14. The touch structure according to claim 13, wherein the plurality of via-holes comprise first via-holes located at turning positions of the second fold lines in the first unshared second metal lines, and the first metal grid row is electrically connected with one of the two second touch sub-electrodes adjacent to the second connection electrode where the first metal grid row is located through the first via-hole; and wherein the plurality of via-holes further comprise second via-holes located at turning positions of the third fold lines in the second unshared second metal lines, and the third metal grid row is electrically connected with another one of the two second touch sub-electrodes adjacent to the second connection electrode where the third metal grid row is located through the second via-hole.

15. The touch structure according to claim 12, wherein each of the plurality of the second connection electrodes further comprise, along the second direction, a third metal grid row which is located on a side of the second metal grid row away from the first metal grid row, and comprises the plurality of the second metal grids arranged along the first direction; and a fourth metal grid row which is located on a side of the third metal grid row near the second metal grid row and adjacent to and connected with the third metal grid row, and comprises at least one of the second metal grids arranged along the first direction, wherein the amount of the second metal grids in the fourth metal grid row is less than the amount of the second meal grids in the third metal grid row, and the second metal lines of the second metal grids in the fourth metal grid row near the third metal grid row are the second metal lines shared with the second metal grids in the third metal grid row.

16. The touch structure according to claim 15, wherein the third metal grid row further comprises second unshared second metal lines opposite to the second metal lines that the fourth metal grid row and the third metal grid row share, the second unshared second metal line are in a shape of a third fold line, and the plurality of fold lines arranged in spacing comprise the third fold line.

17. The touch structure according to claim 15, wherein the second connection electrodes further comprise at least one intermediate metal grid row located between the second metal grid row and the fourth metal grid row, and each of the at least one intermediate metal grid row comprises at least one of the second metal grids;

wherein the at least one intermediate metal grid row comprises second metal lines shared with the second metal grid row or the fourth metal grid row, the second metal lines that the at least one intermediate metal grid row and the second metal grid row or the fourth metal grid row share are in a shape of a fourth fold line, and the plurality of fold lines arranged in spacing comprise the fourth fold line.

18. The touch structure according to claim 2, wherein the insulating layer includes edge slope parts covering the second portions of the plurality of the second metal lines in a direction perpendicular to the line extension direction, each edge slope parts forms a step relative to the surface of the substrate, and the first portions of the plurality of the first metal lines at least partly do not overlap with the edge slope parts.

19. A touch display panel, comprising a base substrate, and a display structure and a touch structure stacked on the base substrate, wherein the touch structure comprises:

a substrate and a first metal grid electrode layer, an insulating layer, and a second metal grid electrode layer on the substrate, wherein the first metal grid electrode layer is located on a side of the second metal grid electrode layer away from the substrate, the insulating layer is disposed between the first metal grid electrode layer and the second metal grid electrode layer;

the first metal grid electrode layer comprises a plurality of first metal grids formed by a plurality of first metal lines, the second metal grid electrode layer comprises a plurality of second metal grid formed by a plurality of second metal lines, first portions of the plurality of the first metal lines and second portions of the plurality of the second metal lines have same line extension directions, respectively, and overlap with each other in a direction perpendicular to a surface of the substrate, wherein the first portions of the plurality of the first metal lines comprise a plurality of first metal sub-lines, the second portions of the plurality of the second metal lines comprise a plurality of second metal sub-lines, the plurality of the first metal sub-lines and the plurality of the second metal sub-lines overlap with each other in a direction perpendicular to the surface of the substrate, and a smallest distance between an edge of each first metal sub-line and an edge of a corresponding second metal line is larger than zero.

20. A display device, comprising a touch display panel, wherein the touch display panel comprises:

a base substrate, and a display structure and a touch structure stacked on the base substrate, wherein the touch structure comprises:

a substrate and a first metal grid electrode layer, an insulating layer, and a second metal grid electrode layer on the substrate, wherein the first metal grid electrode layer is located on a side of the second metal grid electrode layer away from the substrate, the insulating layer is disposed between the first metal grid electrode layer and the second metal grid electrode layer;

the first metal grid electrode layer comprises a plurality of first metal grids formed by a plurality of first metal lines, the second metal grid electrode layer comprises a plurality of second metal grid formed by a plurality of second metal lines, first portions of the plurality of the first metal lines and second portions of the plurality of the second metal lines have same line extension directions, respectively, and overlap with each other in a direction perpendicular to a surface of the substrate, wherein the first portions of the plurality of the first metal lines comprise a plurality of first metal sub-lines, the second portions of the plurality of the second metal lines comprise a plurality of second metal sub-lines, the plurality of the first metal sub-lines and the plurality of the second metal sub-lines overlap with each other in a direction perpendicular to the surface of the substrate, and a smallest distance between an edge of each first metal sub-line and an edge of a corresponding second metal line is larger than zero.

\* \* \* \* \*